Patented Sept. 4, 1934

1,972,493

UNITED STATES PATENT OFFICE 1,972,493

INSULATING BLOCK AND PROCESS OF MAKING THE SAME

Edward R. Powell, Alexandria, Ind., assignor to Johns-Manville Corporation, New York, N. Y., a corporation of New York No Drawing. Application January 29, 1932, Serial No. 589,765

13 Claims. (Cl. 92—21)

This invention relates to an insulating block and process of making the same, more particularly to a block comprising fibrous material and a stiffening agent. It pertains especially to a molded article comprising rock wool and a stiffening agent, either with or without a binder, the stiffening agent being suitably starch incorporated in a suspension in water.

Objects of the invention are to produce a shaped article by a process involving the use of a fibrous substance and a stiffening agent suspended in an aqueous solution that is relatively low in viscosity at the time of molding and to form a light-weight article comprising rock wool and starch in such manner as to give relatively substantial firmness and distribution of the starch throughout the article. Other objects or advantages will be evident from the following description.

Details of one example that illustrates a method of practicing my invention follow.

A mixture is made of several materials, in the following proportions by weight:—mineral wool, such as made by melting and blowing an argillaceous limestone, 70%, asphalt mixed with wax 12%, newspaper pulp 8%, and a starchy material, such as tapioca starch or corn starch, 10%.

The newspaper and asphalt-wax mixture are beaten with a large volume of water at about 205° F., to give a binder. This binder is diluted with sufficient cold water to bring the temperature below the peptizing or cooking temperature of starch. Next, there is admixed into the binder the selected proportion of starch, as stiffening agent, in the form of a mobile slurry containing approximately 10 parts by weight of starch to 90 of water, at 60–80° F. To the resulting mixture of binder and stiffening agent is added the rock wool fibre in dry form. The rock wool used is suitably slightly oiled, as by blowing a small amount of oil into the fibres at the time of their being blown. Also, the rock wool may be freed in part from non-fibrous particles or so-called "shot" by tumbling in a rotating device with gauze walls. The proportion of water in the final mixture may be varied within wide limits, these limits depending in part upon the apparatus to be used for the subsequent felting or molding. Thus, if the felting is to be made on a board machine, the total solids content may be very small, as for example, ½% or more of the water present. For shaping in a mold with draining bottom of the type described below, the total solids content should be much higher, suitably 6 to 10% of the total weight of the water mixture.

At no stage during the making of the above mixture should the starch, or starch material, be in contact with water at a temperature sufficiently high to peptize the starch. By peptizing of starch I mean the dispersion at an elevated temperature as very small particles or swelling in water. The safe working temperature for avoidance of peptizing during mixing will vary somewhat with the kind of starch used. Thus the temperature of peptizing is about 180° F. for corn starch and the maximum safe mixing temperature about 160° F. If tapioca starch is used, the corresponding temperatures are about 140 to 145° and 120 to 130° F., respectively. The term "peptizing" is used to include all changes which occur in water suspensions of these starches at the temperatures stated.

The mixture comprising the mineral wool fibre and the raw starch, and suitably also the binder as described, is then molded in frames with gauze or draining bottoms. The pressure applied to the composition in the molds should be low, as, for example, about 6 to 40 pounds, to the square foot. During this operation the water content is reduced to approximately 85 parts of water to 15 of solids. The block or shape is then introduced into an oven maintained at about 350 to 400° F. This condition is maintained for about 1 to 8 hours, as, for example, 6 hours, to cook or peptize the starch in place among the fibers. Then the temperature is gradually reduced over a period of 20 to 24 hours and drying is completed at an oven temperature of approximately 275 to 300° F. The dried blocks may then be trimmed to accurate shape and size for shipment.

The process as described involves peptizing or swelling of the starch between the fibers of rock wool, obviates certain manufacturing difficulties, including difficulties in draining out a part of the water during molding, and produces a product of exceptional quality.

After drying, the blocks may be trimmed, as by sawing, to give the exact size desired or remove discolored or uneven, hard surfaces, such as may be formed during the drying treatment.

The above example has been given for the purpose of illustration, not limitation, of the invention. Many variations may be made without departing from the scope of the invention. For example, I may use a fibrous substance other than rock wool. Thus I may use mineral or slag wool, glass wool, or other non-textile fibre, although rock wool has given exceptional results in my process. The fibers may be employed either in loose form or in the form of nodules or pellets, such as the commercial product "nodulated" rock wool. For stiffening agents I may use raw or uncooked starch or a starchy material or other substance that is capable of forming a fairly fluid slurry and insoluble or only slowly soluble when suspended in cold water and adapted (1) to peptize or soften when a water suspension of it is heated, and (2) to stiffen or produce a hard and adherent mass with the other ingredients of the block after drying.

In place of starch, there may be used other stiffening agents, for example, animal glues that are not readily soluble in cold water but are peptizable in hot water. The glue should be added, in finely powdered form, in cold water and a suspension of the glue and rock wool then molded into blocks, with subsequent draining off of excess water. When the blocks are heated the glue becomes soluble, disperses throughout the mass, and, when dry, exercises a stiffening action.

As a binding agent or binder in addition to the starch there may be used, as an alternative for the asphalt-wax gel mixture mentioned above, asphalt emulsified with clay or Bentonite, a wax, such as the liquid product from the sweating process of purifying paraffin wax, and/or a resinous or gummy substance. The asphaltic binder may be omitted entirely, although a bituminous or oily product is desirable, particularly where water-proofing is desired. Soluble glues and gums may be used up to the concentration in which they impart a slight "tackiness" to the water. Higher concentrations of soluble binders must be avoided, as they interfere with the proper drainage and molding of the blocks.

Also, the proportions of materials may be varied within limits. Thus, I may use 3% or more of the stiffening agent, as, for example, 5 to 10% of starch on the weight of the rock wool fibre. Also, I may add the starch as a suspension with widely varying proportions of starch to water, as for example, 5 to 15 parts by weight of starch to 85 to 95 of water. I may perform the mechanical operations, such as molding, pressing, and sawing, in conventional manner.

Another specific example of a method of practicing my invention follows: There is made a mixture comprising 84 parts by weight of rock wool, 13 of starch (added as a suspension in cold water), 2 of paper pulp, one-half part of a liquid wax, such as a high boiling fraction of petroleum containing some liquid and some solid at ordinary temperature, and one-half part of a resinous or gummy substance, as, for example, an oxidized, chlorinated or otherwise modified starch. The wax, the paper pulp, and, in some cases, also the resinous or gummy substance, may be beaten together, in water, before being added to the aqueous suspension of starch and rock wool. The final mixture is submitted to molding and drying, as before, to peptize the starch.

The blocks made according to my invention are sufficiently light in weight, porous and strong to be useful as sound-absorbing or thermal insulating material at relatively low temperatures.

While the process has been described for making blocks, the finished composition may have other form desired, as for example, pipe covering, board or brick shapes. Or, the finished block may be broken down into small pieces, such as granules or fibrous lumps.

The suspension of non-peptized stiffening agent in water is relatively mobile, that is, much less viscous than the composition would be if the stiffening agent were peptized.

The details that have been given are for the purpose of illustration, not restriction, and variations therefrom may be made within the scope of the appended claims.

What I claim is:

1. The production of a porous block containing mineral fibers by a process which comprises mixing with the fibers a relatively mobile, aqueous suspension of a stiffening agent adapted to peptize on warming and to become stiff after drying, shaping the resulting mixture, and then heating the shaped product to a temperature sufficient to peptize the stiffening agent.

2. The production of a block containing mineral-wool by a process which comprises adding to the mineral-wool a relatively mobile, aqueous suspension of a stiffening agent containing at least five per cent of stiffening agent on the weight of the mineral-wool and adapted to peptize on warming to a temperature near the boiling point of the suspension, shaping the mixture, and then warming and drying the shaped product.

3. The production of a block comprising mineral-wool and starch by a process which comprises mixing with the mineral-wool a relatively mobile aqueous suspension of the starch in non-peptized condition, draining, molding the mixture at a pressure of approximately six pounds per square foot, and warming the molded block to a temperature at which the starch peptizes.

4. The formation of a block that contains mineral-wool and starch by a process comprising mixing a relatively mobile suspension of non-peptized starch in water with the mineral-wool, shaping the mixture, draining out a part of the water, and then raising the temperature to that at which the starch peptizes readily.

5. The formation of a porous insulating block that contains mineral-wool, a binder, and a stiffening agent by a process comprising mixing a relatively mobile suspension of the stiffening agent in water with the mineral-wool and binder, shaping the mixture, draining out a part of the water, and warming the product.

6. The formation of a porous insulating block that contains mineral-wool and starch by a process comprising mixing a relatively mobile suspension of non-peptized starch in water with the mineral-wool, shaping the mixture, draining out a part of the water, subjecting the shaped and drained product to a temperature of approximately 350 to 400° F., to peptize the starch, and then drying the product.

7. The formation of a block that contains chiefly mineral-wool and starch by a process comprising mixing a relatively mobile suspension of non-peptized starch in water with the mineral-wool, shaping the mixture, draining out a part of the water, and subjecting the shaped and drained product to a temperature of approximately 350 to 400° F. for approximately 1 to 4 hours, and then subjecting it to a temperature of about 275 to 300° F. to dry the product.

8. In the process of making a block containing mineral-wool, a water-proof binder, and non-peptized, peptizable stiffening agent, the step which comprises mixing the wool with an aqueous suspension of the binder and stiffening agent in non-peptized form, shaping the mixture into a block, and then warming the block to peptize the stiffening agent.

9. In the process of making a block containing mineral-wool, asphalt, and starch, the step which comprises adding the starch as an aqueous suspension of more than 5 pounds of raw starch to 95 of water, shaping the mixture into a block, and then subjecting the block to a temperature of 350 to 400° F.

10. The formation of a block comprising mineral-wool, emulsified asphalt, pulped wood, and a stiffening agent by a process which includes the step of adding an aqueous suspension of the stiffening agent in non-peptized condition to an aqueous mixture of the other ingredients, shaping the resulting mixture, and then warming the shaped article to a temperature at which the stiffening agent peptizes.

11. The formation of a relatively hard block comprising mineral fiber and a stiffening agent adapted to peptize in hot water by a process which includes forming a wet block of the fiber and stiffening agent in non-peptized condition, warming the wet block at an elevated temperature, so that a peptizing action takes place progressively from the surface to the center of said block, and then drying the block at a lower temperature, in a manner similarly progressive.

12. The method of making an insulating material by a process comprising forming a wet block containing chiefly mineral-wool and non-peptized starch, cooking the starch progressively from the outside to the inside of the block, and subsequently drying in the same order.

13. The formation of a relatively hard block comprising mineral fiber and a stiffening agent adapted to peptize in hot water by a process which includes forming a wet block of the fiber and stiffening agent in non-peptized form and warming the wet block at an elevated temperature to form a crust on the surface and facilitate the action of the stiffening agent with water.

EDWARD R. POWELL.